United States Patent
Kim et al.

(10) Patent No.: US 9,313,381 B2
(45) Date of Patent: Apr. 12, 2016

(54) DISPLAY APPARATUS

(71) Applicant: SAMSUNG ELECTRONICS CO., LTD., Suwon-si (KR)

(72) Inventors: Hak-young Kim, Yongin-si (KR); Go-hyun Kim, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/445,204

(22) Filed: Jul. 29, 2014

(65) Prior Publication Data

US 2015/0029390 A1    Jan. 29, 2015

(30) Foreign Application Priority Data

Jul. 29, 2013    (KR) .................. 10-2013-0089894

(51) Int. Cl.
*H04N 5/225*    (2006.01)
*G06F 1/16*    (2006.01)
*G06F 3/01*    (2006.01)

(52) U.S. Cl.
CPC ............ *H04N 5/2251* (2013.01); *G06F 1/1605* (2013.01); *H04N 5/2257* (2013.01); *G06F 3/017* (2013.01)

(58) Field of Classification Search
CPC ... H04N 5/2257; H04N 5/2251; G06F 3/0304
USPC .................................................. 348/373–375
See application file for complete search history.

(56) References Cited

U.S. PATENT DOCUMENTS 5,502,598 A *  3/1996  Kimura ................. G02B 7/023
                                                      348/E5.028
6,734,914 B1 *  5/2004  Nishimura ........... H04N 5/2251
                                                       348/207.99

* cited by examiner

*Primary Examiner* — Tuan Ho
(74) *Attorney, Agent, or Firm* — Staas & Halsey LLP

(57) ABSTRACT

A display apparatus which provides user interaction includes a display main body having a display screen, a camera module mounted on the display main body and configured to image a user to perform the user interaction, and a camera door configured to slidably move between a first location in which light is blocked to be incident to the camera module and a second location in which light is permitted to be incident to the camera module.

17 Claims, 13 Drawing Sheets

DISPLAY APPARATUS

CROSS-REFERENCE TO RELATED APPLICATION

This application claims priority from Korean Patent Application No. 10-2013-0089894, filed on Jul. 29, 2013, in the Korean Intellectual Property Office, the disclosure of which is incorporated herein by reference in its entirety.

BACKGROUND

1. Field

Apparatuses and methods consistent with exemplary embodiments relate to a display apparatus mounted with a camera module for user interaction.

2. Description of the Related Art

In recent years, with expansion of smart interactive functions, display apparatuses capable of user interaction are emerging. Camera modules configured to sense an action of a user or voice sensing modules configured to sense voice of a user are necessarily mounted on the display apparatuses, and operations of the display apparatuses may be controlled according to the sensed action or voice of the user.

In general, the camera modules for user interaction are mounted on upper ends of the display apparatuses to maintain an exposed state. The camera modules mounted to maintain the exposed state may give an unpleasant feeling like being under surveillance to the user.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments are to provide a display apparatus capable of removing unpleasant feeling like under surveillance by a camera module for user interaction.

According to an aspect of an exemplary embodiment, there is provided a display apparatus which provides user interaction. The display apparatus may include: a display main body having a display screen; a camera module mounted on the display main body and configured to image a user to perform the user interaction; and a camera door configured to slidably move between a first location in which light is blocked to be incident to the camera module and a second location in which light is permitted to be incident to the camera module.

The camera door may have a light transmission window disposed in front of the camera module in the second location.

The display apparatus may further include a camera module support body configured to support the camera module.

A locking projection configured to stop sliding of the camera door in the second location when the camera door slides from the first location to the second location may be formed in the camera module support body.

At least one sliding rib may be formed in the camera door, and at least one slide guide groove into which the at least one sliding rib is slidably inserted may be formed in the camera module support body.

The slide guide groove may include a first slide guide groove formed in a top of the camera module support body, and a second slide guide groove formed in a bottom of the camera module support body. The locking projection may be formed in one end portion of the first slide guide groove.

A first fixing groove configured to fix the sliding rib in the first location and a second fixing groove spaced apart from the first fixing groove and configured to fix the sliding rib in the second location may be formed in the second slide guide groove.

The camera module support body may be tiltably mounted on the display main body on the basis of a rotation axis perpendicular to an optical axis of the camera module.

The camera door may be slidably mounted on the camera module support body between the first location and the second location.

A location control knob for driving of sliding of the camera door and driving of tilt of the camera module support body may be formed in the camera door.

The location control knob may be exposed in a front of the camera door.

The display apparatus may further include a friction pad configured to be in contact with the camera module support body and give friction force to the camera module support body when the camera module support body is tilted.

The display apparatus may further include an interaction casing configured to receive the camera door and the camera module support body. A front opening configured to expose the location control knob in the first location and expose the light transmission window and the location control knob in the second location may be formed in the interaction casing.

A pair of shaft protrusions may be formed in both sides of the camera module support body, and a pair of shaft grooves into which the pair of shaft protrusions are inserted may be formed in the interaction casing. The camera door and the camera module support body may be tilted on the basis of the rotation axis according to vertical pressing of the location control knob.

The display apparatus may further include a friction pad mounted on the interaction casing to be in contact with the camera module support body, and give friction force to the camera module support body when the camera module support body is tilted.

The display apparatus may further include a driving switch mounted on the interaction casing and configured to drive the camera module through contact between a first terminal and a second terminal disposed to be spaced apart from each other. The first terminal may be pushed by the camera door and come in contact with the second terminal when the camera door moves to the second location.

A receiving groove in which the camera module is received and at least one hook fitting groove, to which a fixing hook configured to fix the camera module to the receiving groove is fit, may be formed in the camera module support body.

A lens cleaning member configured to be in contact with a front of the camera module when the camera door is slid may be mounted on an inner surface of the camera door.

According to an aspect of an exemplary embodiment, there is provided a display apparatus which provides user interaction. The display apparatus may include: a display main body having a display screen; a camera module configured to image a user to perform the user interaction; a camera module support body configured to support the camera module; and a camera door movably mounted on the camera module support body between a first location in which light is blocked to be incident to the camera module and a second location in which light is permitted to be incident to the camera module. The camera module support body may be tiltably mounted on the display main body on the basis of a rotation axis perpendicular to an optical axis of the camera module.

Additional aspects and advantages of the exemplary embodiments will be set forth in the detailed description, will be obvious from the detailed description, or may be learned by practicing the exemplary embodiments.

BRIEF DESCRIPTION OF THE DRAWING FIGURES

The above and/or other aspects will be more apparent by describing in detail exemplary embodiments, with reference to the accompanying drawings, in which.

DETAILED DESCRIPTION OF THE EXEMPLARY EMBODIMENTS

Figure 1:
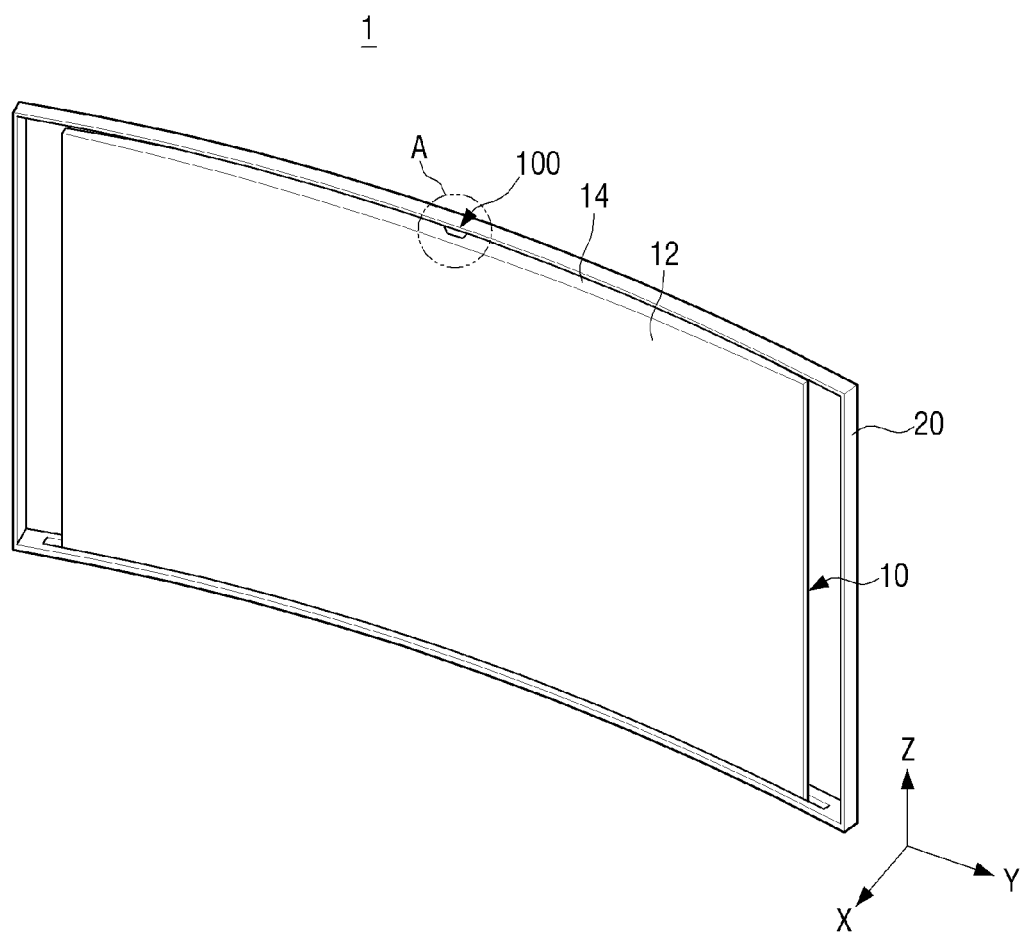
FIG. 1 is a perspective view illustrating a display apparatus according to an exemplary embodiment.

Hereinafter, exemplary embodiments will be described in more detail with reference to the accompanying drawings.

In the following description, the same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

Figure 2:
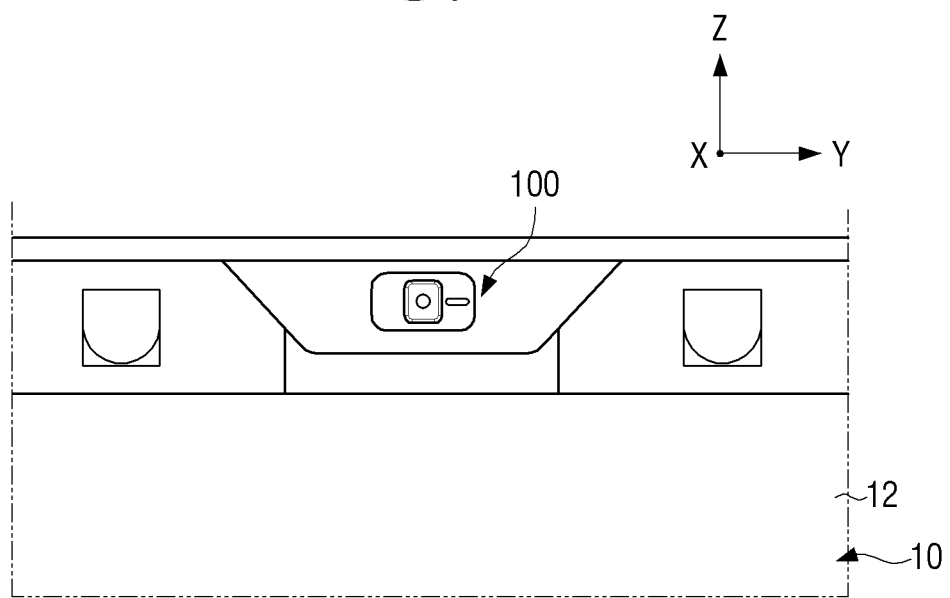
FIG. 2 is an enlarged perspective view illustrating a region "A" of FIG. 1.

FIG. 1 is a perspective view illustrating a display apparatus according to an exemplary embodiment, and FIG. 2 is an enlarged perspective view illustrating a region "A" of FIG. 1.

Referring to FIGS. 1 and 2, a display apparatus 1 may sense various gestures or voices of a user through user interaction, and perform various control operations based on the sensed gestures or voices. The control operations may include, for example, channel change, volume up or down, application execution, or the like.

The display apparatus 1 includes a display main body 10, a frame 20, and an interaction unit 100.

The display main body 10 has a display screen 12 in which an image is displayed. A user may watch various pieces of contents provided from the display apparatus 1 through the display screen 12. The frame 20 supports the display main body 10 so that the user may watch the display screen 12.

The display main body 10 may be a curved display. The display main body 10 may be a liquid crystal display (LCD) television (TV), a light emitting diode (LED) TV, or an organic light emitting device (OLED) TV. In addition, the display main body 10 may be other types of curved displays. Other than the curved displays, the display main body 10 may be a flat panel display or a flexible display. Further, the display main body 10 may be a computer monitor other than the TV.

The interaction unit 100 is configured to sense various gestures or voices for user interaction. The interaction unit 100 may be mounted on the display main body 10 to be disposed on a top 14 of the display main body 10.

Figure 3:
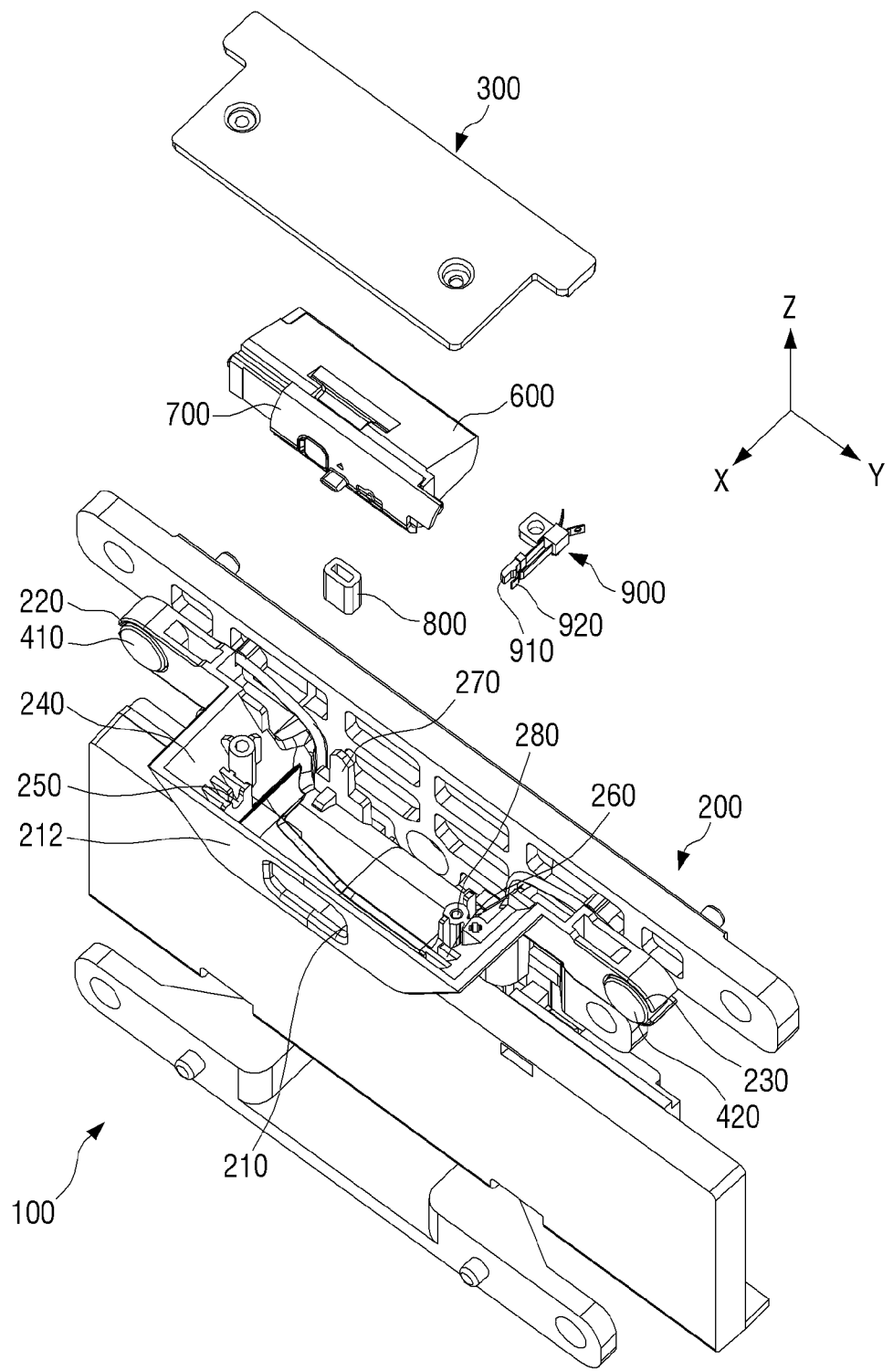
FIG. 3 is an exploded perspective view illustrating an interaction unit of the display apparatus of FIG. 1.
Figure 4:
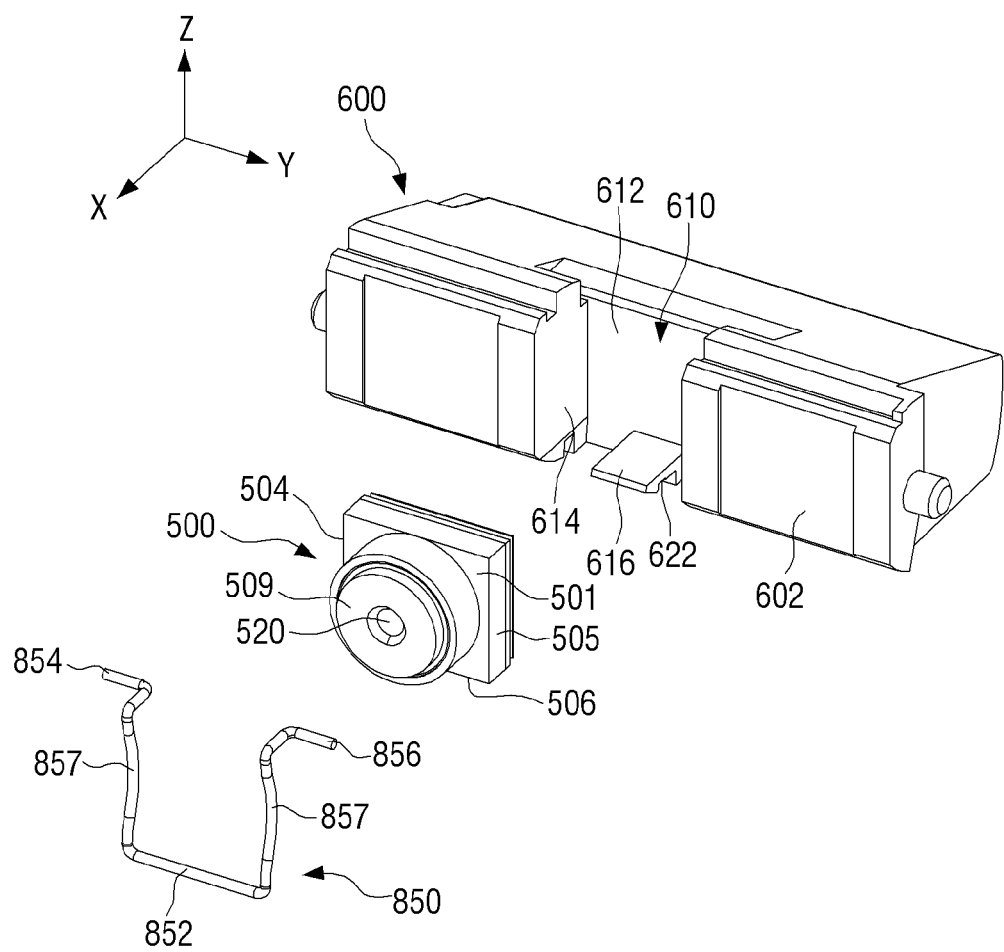
FIGS. 4 and 5 are views illustrating mounting of a camera module.
Figure 5:
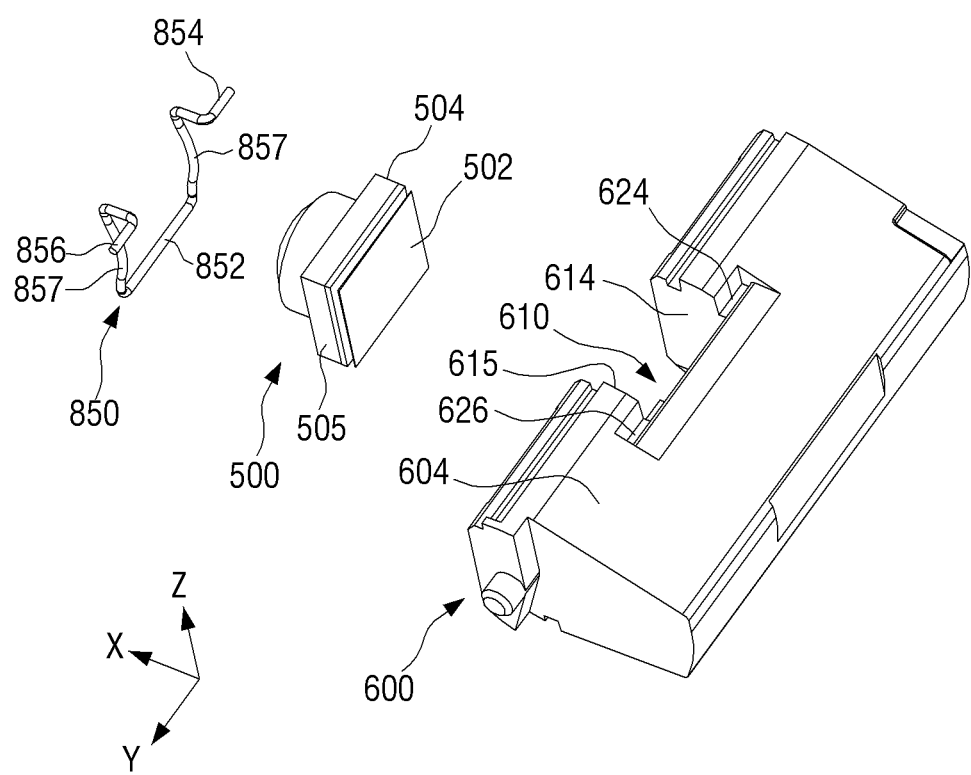
Figure 6:
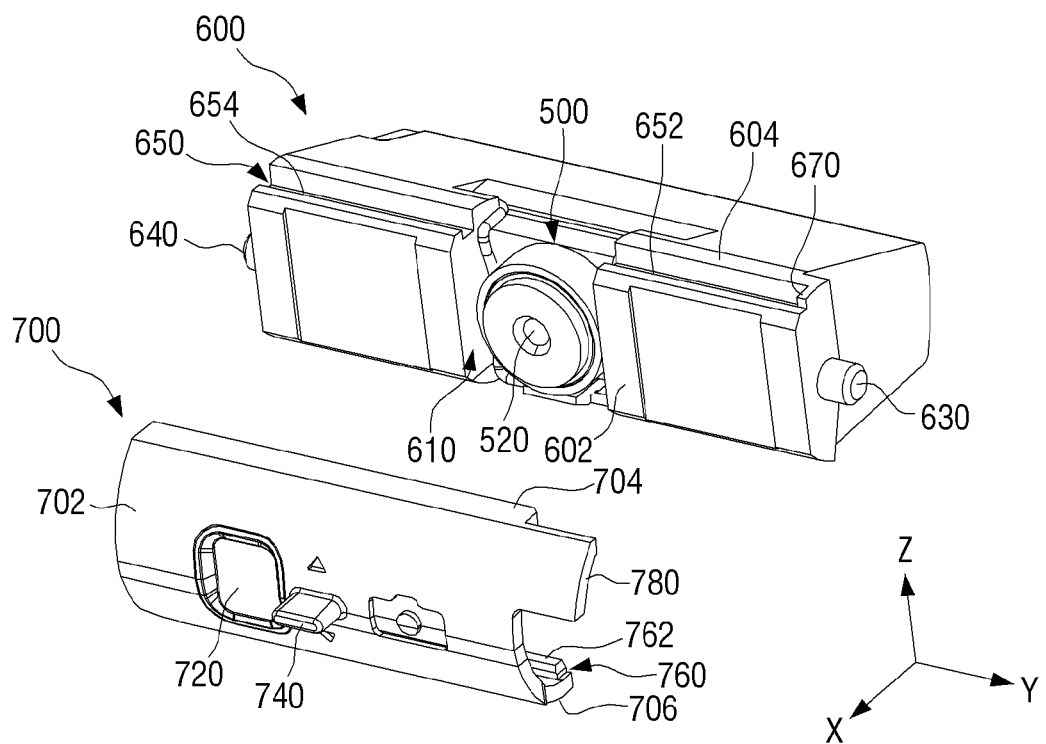
FIGS. 6 to 8 are perspective views illustrating main parts of the interaction unit of FIG. 3.
Figure 7:
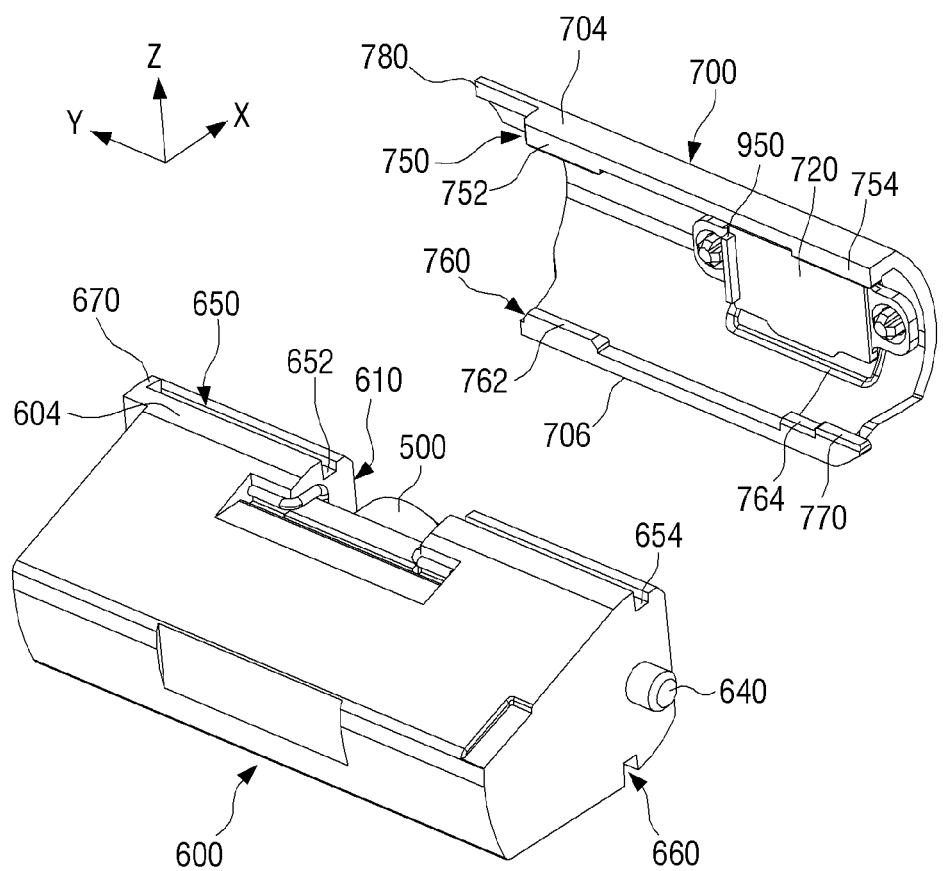
Figure 8:
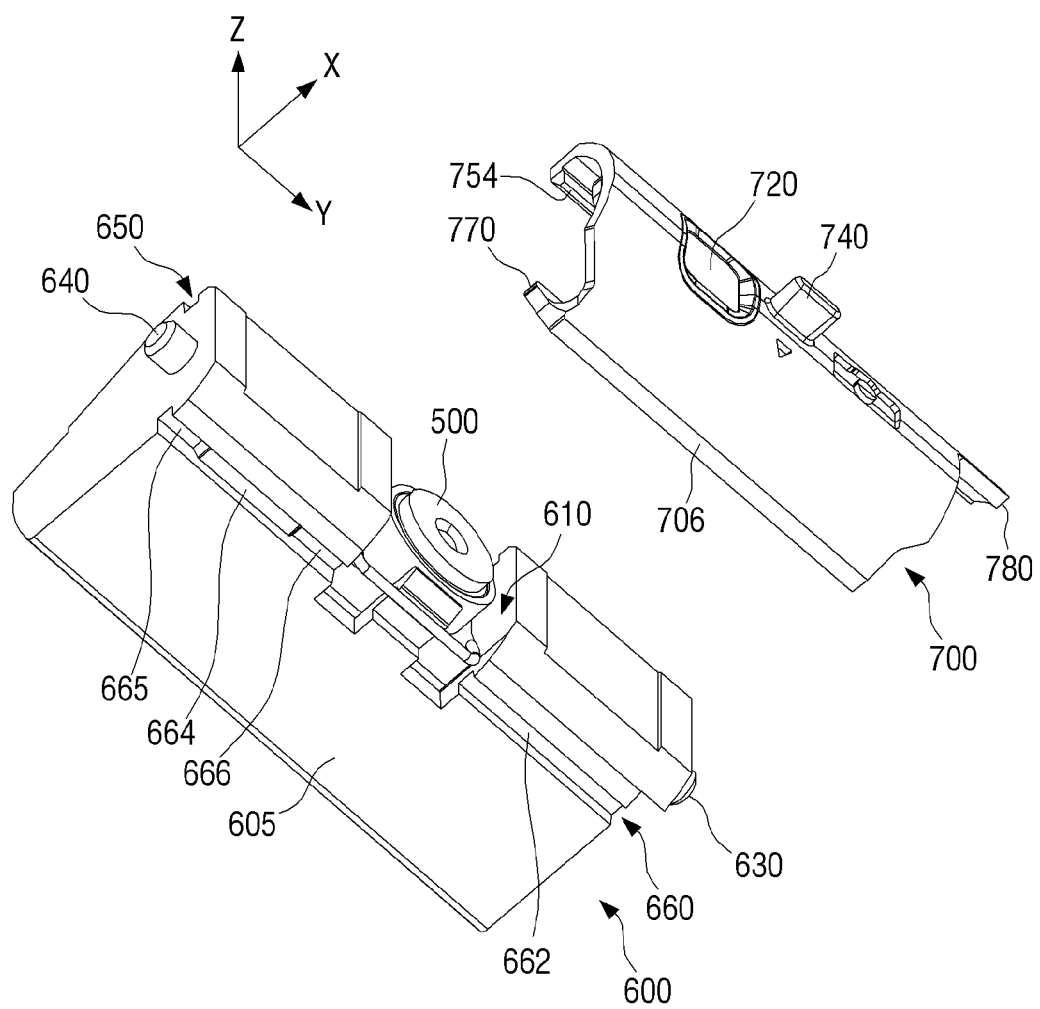

FIG. 3 is an exploded perspective view illustrating the interaction unit of the display apparatus of FIG. 1, FIGS. 4 and 5 are views illustrating mounting of a camera module, and FIGS. 6 to 8 are exploded perspective views illustrating main parts of the interaction unit of FIG. 3.

Referring to FIGS. 3 to 8, the interaction unit 100 includes an interaction casing 200, a casing cover 300, voice sensing modules 410 and 420, a camera module 500, a camera module support body 600, a camera door 700, a friction pad 800, and a driving switch 900.

The interaction casing 200 receives the camera module 500 and the voice sensing modules 410 and 420, and a printed circuit board (PCB, not shown) configured to operate the camera module 500 and the voice sensing modules 410 and 420 is built into the interaction casing 200. In the exemplary embodiment, the interaction casing 200 is mounted on an upper portion of the display main body 10 (see FIG. 2), and the interaction casing 200 may be integrally formed with the display main body 10.

The interaction casing 200 includes a front opening 210 (see FIG. 3.), voice sensing module mounting grooves 220 and 230, a receiving portion 240, shaft grooves 250 and 260, a friction pad fitting protrusion 270, and a driving switch mounting unit 280.

The front opening 210 is formed in a front 212 of the interaction casing 200 exposed in the upper portion of the display main body 10. A position control knob 740 (see FIG. 8.) of the camera door 700 protrudes in the front opening 210 to a front direction (a +X-direction). As described in FIGS. 11 and 12 below, a light transmission window 720 of the camera door 500 is exposed through the front opening 210 during imaging.

The voice sensing modules 410 and 420 are mounted on the voice sensing module mounting grooves 220 and 230, and the voice sensing module grooves 220 and 230 are provided in the interaction casing 200 to correspond to the voice sensing modules 410 and 420. In the exemplary embodiment, since a pair of voice sensing modules 410 and 420 are provided, a pair of voice sensing module mounting grooves 220 and 230 are also provided in the interaction casing 200.

The receiving portion 240 is configured to receive the camera module support body 600 and the camera door 700 and formed in the back of the front 212 of the interaction casing 200. The shaft grooves 250 and 260, the fiction pad fitting protrusion 270, and the driving switch mounting unit 280 to be described below are formed in the receiving portion 240.

The shaft grooves 250 and 260 are configured to tilt the camera module support body 600 on the basis of a rotation axis perpendicular to an optical axis of the camera module 500 and disposed to be spaced apart from each other in the receiving portion 240. At this time, it can be seen from FIG. 3 that the rotation axis of the camera module support body 600 is parallel to a Y-axis.

The friction pad fitting protrusion 270 is provided in the rear of the receiving portion 240, and the friction pad 800 is fit to the friction pad fitting protrusion 270. The driving switching mounting unit 280 is configured to be mounted with the driving switch 900 and fixes the driving switch 900 to the inside of the receiving portion 240 through fastening members, such as bolts.

The casing cover 300 is configured to cover the receiving portion 240 and mounted on the interaction casing 200 through a fastening member such as a bolt. The casing cover 300 forms an outer appearance of the interaction unit 100 together with the interaction casing 200.

The voice sensing modules 410 and 420 are configured to sense a voice of the user. In the exemplary embodiment, the pair of voice sensing modules 410 and 420 are provided to be mounted on the voice sensing module mounting grooves 220 and 230. The voice sensing modules 410 and 420 may be microphones.

The camera module 500 is configured to sense a gesture of the user and is mounted on the camera module support body 600 (see FIG. 5). The camera module 500 includes at least one lens 520 configured to collect light, an image sensor (not shown) configured to convert an image into an electrical signal, and an actuator (not shown) configured to move the lens to adjust a focus.

The camera module support body 600 supports the camera module 500. The camera module support body 600 may be formed of an aluminum material to dissipate heat generated in the camera module 500. The camera module support body 600 may be formed of other materials for heat dissipation of the camera module 500 other than the aluminum material.

Referring to FIGS. 4 and 5, the camera module support body 600 includes a receiving groove 610 and a plurality of hook fitting grooves 622, 624, and 626.

The receiving groove 610 includes a rear supporter 612 configured to support a rear 502 of the camera module 500, first and second side supporters 614 and 615 configured to support left and right sides 504 and 505 of the camera module 500, and a bottom supporter 616 configured to support a bottom 506 of the camera module 500.

The plurality of hook fitting grooves 622, 624, and 626 include first to third hook fitting grooves 622, 624, and 626. The first hook fitting groove 622 is formed in a bottom of the bottom supporter 616. The second hook fitting groove 624 is formed in a top 604 of the camera module support body 600, and disposed adjacent to the first side supporter 614. The third hook fitting groove 626 is formed on the top 604 of the camera module support body 600 and disposed adjacent to the second side supporter 615.

A mounting process of the camera module support body 600 of the camera module 500 will be described. First, the camera module 500 is received in the receiving groove 610 of the camera module support body 600. At this time, the rear 502, the left side 504, the right side 505, and the bottom 506 of the camera module 500 are supported by the rear supporter 612, the first side supporter 614, the second side supporter 615, and the bottom supporter 616 of the receiving groove 610. Next, a first hook fitting portion 852 of a hook 850 is fit to the first hook fitting groove 622, a second hook fitting portion 854 of the hook 850 is fit to the second hook fitting groove 624, and a third hook fitting portion 856 of the hook 850 is fitted to the third hook fitting groove 626. Then, a pressing portion 857 of the hook 850 continuously presses a front 501 of the camera module 500 to a rear direction (a -X-direction) of the camera module support body 600. Through the pressing portion 857 of the hook 850, the camera module 500 may be rigidly fixed to and mounted on the camera module support body 600.

When the camera module 500 is mounted, a lens mounting surface 509, which is disposed in a forefront of the camera module 500 mounted with the lens 520, is disposed at the back rather than the front 602 of the camera module support body 600 or disposed on the same line as the front 602 of the camera module support body 600 to prevent interference with the camera door 700 to be described later when the camera door 700 is slid.

Hereinafter, the camera module support body 600 and the camera door 700 will be described in more detail with reference to FIGS. 6 to 8.

Referring to FIGS. 6 to 8, the camera module support body 600 further includes a pair of shaft protrusions 630 and 640, a first slide guide groove 650, a second slide guide groove 660, and a locking projection 670.

The pair of shaft protrusions 630 and 640 are provided at both sides of the camera module support body 600, and formed in corresponding locations to each other. The pair of shaft protrusions 630 and 640 are fit to corresponding shaft grooves 250 and 260 of the interaction casing 200. Therefore, the camera module support body 600 may be tiltably mounted on the interaction casing 200 on the basis of the rotation axis perpendicular to the optical axis of the camera module 500.

The first slide guide groove 650 is formed on the top 604 of the camera module support body 600. The first slide guide groove 650 includes a first sub slide guide groove 652 and a second sub slide guide groove 654. The first sub slide guide groove 652 and the second sub slide groove 654 are disposed to be spaced apart from each other with the receiving groove 610 interposed therebetween.

The second slide guide groove 660 is formed in the bottom 605 of the camera module support body 600. The second slide guide groove 660 includes a third sub slide guide groove 662 and a fourth sub slide guide groove 664. The third sub slide guide groove 662 and the fourth sub slide guide groove 664 are disposed to be spaced apart from each other with the receiving groove 610 interposed therebetween.

A first fixing groove 665 configured to fix the camera door 700 in a first location (a location in which light is blocked to be incident to the camera module 500) is formed in one end portion of the fourth sub slide guide groove 664, and a second fixing groove 666 configured to fix the camera door 700 in a second location (a location in which light is permitted to be incident to the camera module 500) is formed in the other end portion of the fourth sub slide guide groove 664.

The locking projection 670 is configured to stop sliding of the camera door 700, and formed in an end portion of the first sub slide guide groove 652 of the first slide guide groove 650.

The camera door 700 is slidably mounted along a length direction (the Y-direction) of the camera module support body 600 to partially cover the front 602 of the camera module support body 600.

The camera door 700 includes the light transmission window 720, the location control knob 740, a first sliding rib 750, a second sliding rib 760, a fixing protrusion 770, and a driving switch push portion 780.

The light transmission window 720 is configured to guide light to the camera module 500, and formed in a front 702 of the camera door 700. To this end, the light transmission window 720 is formed of a material which may transmit light, such as glass.

A lens cleaning member 950 is mounted on a surface of the light transmission window 720, which faces the camera module 500. The lens cleaning member 950 also slides to clean the lens 520 of the camera module 500 when the camera door 700 is slid. To this end, the lens cleaning member 950 may include nonwoven fabric. Therefore, the display apparatus 1 according to the exemplary embodiment may clean the lens 520 of the camera module 500 when the camera door 700 is slid.

The location control knob 740 is formed in the front 702 of the camera door 700, and protrudes to the front direction (a +X-direction) of the camera door 700. The location control knob 740 is formed in a location close to the light transmission window 720.

The first sliding rib 750 is formed in a top 704 of the camera door 700. The first sliding rib 750 includes a first sub sliding rib 752 and a second sub sliding rib 754. The first sub sliding rib 752 and the second sub sliding rib 754 are disposed to be spaced apart from each other.

The first sub sliding rib 752 is slidably fit to the first sub slide guide groove 652 along the first sub slide guide groove 652. The second sub sliding rib 754 is slidably fit to the second sub slide guide groove 654 along the second sub slide guide groove 654.

The second sliding rib 760 is formed in a bottom 706 of the camera door 700. The second sliding rib 760 includes a third sub sliding rib 762 and the fourth sub sliding rib 764. The third sub sliding rib 762 and the fourth sub sliding rib 764 are disposed to be spaced apart from each other.

The third sub sliding rib 762 is slidably fit to the third sub slide guide groove 662 along the third sub slide guide groove 662. The fourth sub sliding rib 764 is slidably fit to the fourth sub slide guide groove 664 along the fourth sub slide guide groove 664.

The fixing protrusion 770 is configured to fix the camera door 700, and formed to protrude from the fourth sliding rib 764. The fixing protrusion 770 is inserted into the first fixing groove 665 in the first location (the location in which light is blocked to be incident to the camera module 500), and inserted into the second fixing groove 666 in the second location (the location in which light is permitted to be incident to the camera module 500).

The driving switch push portion 780 is formed in one end portion of the front of the camera door 700. The driving switch push portion 780 pushes the driving switch 900 to be turned on and drives the camera module 500 when the camera door 700 moves to the second location.

Hereinafter, the remaining components of the interaction unit 100 will be described in more detail.

Referring back to FIG. 3, the friction pad 800 is configured to prevent backlash of the camera module support body 600 after tilt adjustment of the camera module 500, and fit to the friction pad fitting protrusion 270 of the receiving portion 240. The friction pad 800 is formed of a rubber material, and is in contact with the camera module support body 600.

The term "tilt" means that a location of a camera is fixed and only an angle moves downward or upward to perform imaging. In the display apparatus 1 according to the exemplary embodiment, when the tilt of the camera module 500 is adjusted, the backlash of the camera module support body 600 is not caused due to friction force between the camera module support body 600 and the friction pad 800 after the tilting of the camera module 500. Thus, the display apparatus 1 according to the exemplary embodiment enables accurate tilt adjustment.

The driving switch 900 is configured to control ON/OFF of the voice sensing modules 410 and 420 and the camera module 500, and mounted on the driving switch mounting unit 280. The driving switch 900 includes a first terminal 910 and a second terminal 920. The first terminal 910 is spaced apart from the second terminal in non-imaging, and pushed by the driving switch push portion 780 to be in contact with the second terminal 920 in imaging. The driving switch 900 turns on power of the voice sensing modules 410 and 420 and the camera module 500 when the first terminal 910 is in contact with the second terminal 920, and turns off the power of the voice sensing modules 410 and 420 and the camera module 500 when the first terminal 910 is spaced apart from the second terminal 920.

Figure 9:
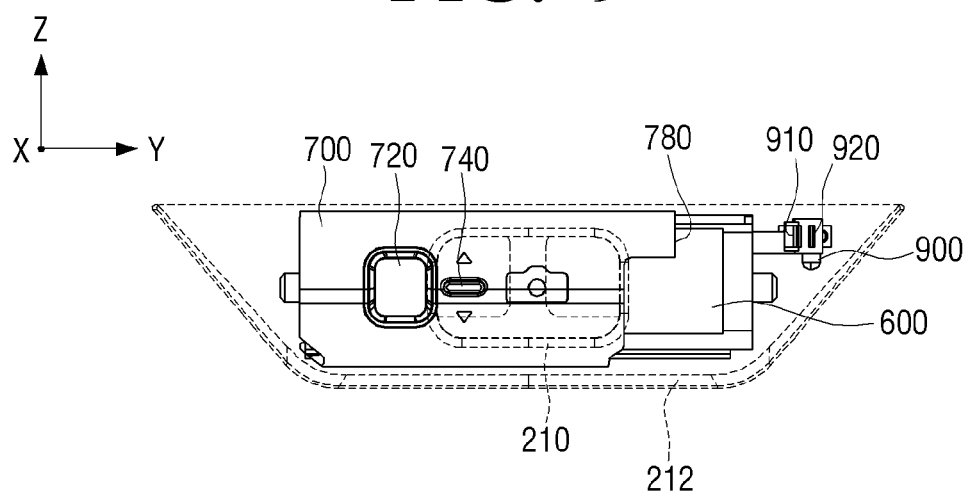
FIGS. 9 and 10 are views illustrating a camera door disposed in a first location in non-imaging.
Figure 10:
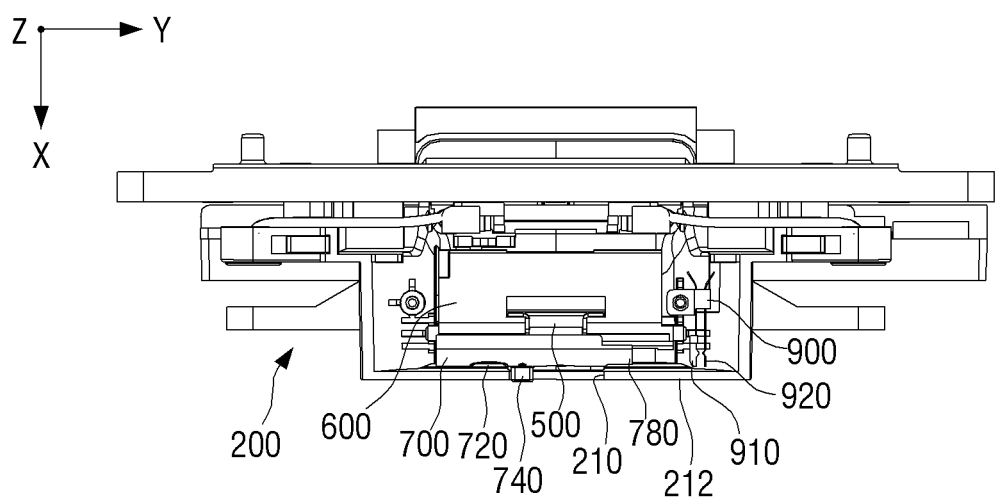

FIGS. 9 and 10 are views illustrating a camera door disposed in a first location in non-imaging.

Referring to FIGS. 9 and 10, the camera door 700 is disposed in the first location in which light is blocked to be incident to the camera module 500 in non-imaging. Specifically, the camera door 700 is biasedly disposed in the left of the camera module support body 600 and allows the light transmission window 720 of the camera door 700 to be deviated from the front opening 210. At this time, the fixing protrusion 770 (see FIG. 7) of the camera door 700 is inserted into the first fixing groove 665 (see FIG. 8) of the camera module support body 600 and fixes the camera door 700 to the first location (the location in which light is blocked to be incident to the camera module 500). Therefore, the camera module 500 is blocked by the camera door 700 and not shown in the front opening 210.

The driving switch push portion 780 of the camera door 700 is disposed to be spaced apart from the first terminal 910 of the driving switch 900 in non-imaging. Therefore, the driving switch push portion 780 maintains a power-off state of the voice sensing modules 410 and 420 and the camera module 500 since the first terminal 910 is disposed to be spaced apart from the second terminal 920 in non-imaging.

Figure 11:
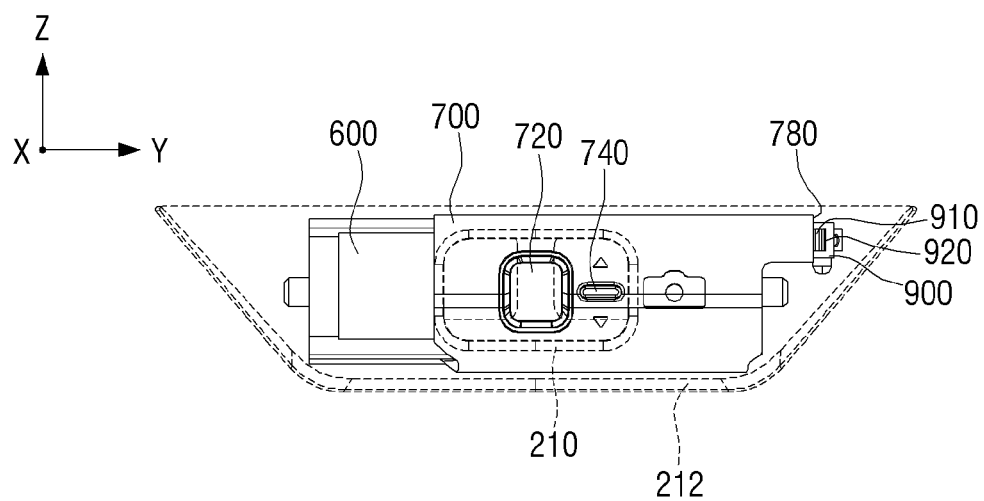
FIGS. 11 and 12 are views illustrating a camera door disposed in a second location in imaging.
Figure 12:
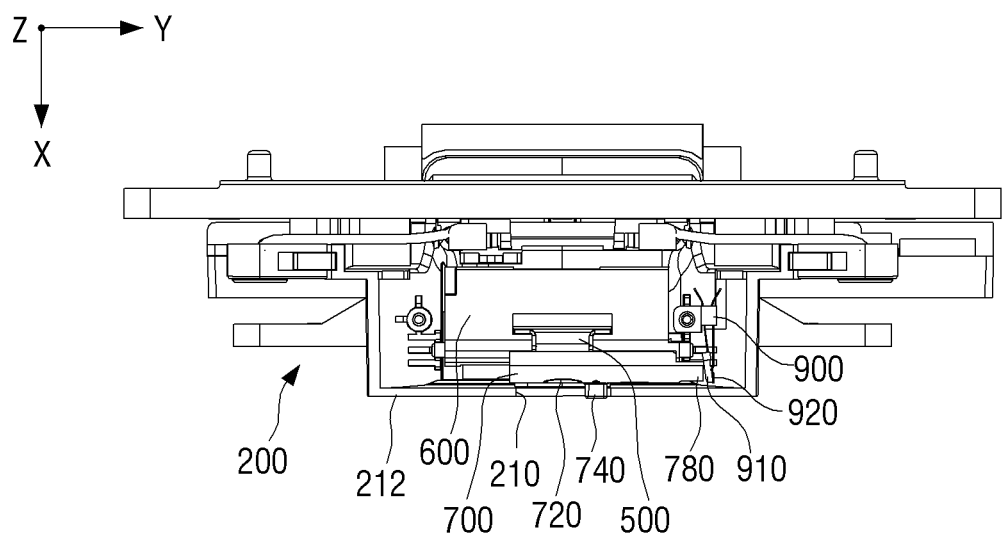

FIGS. 11 and 12 are views illustrating a camera door disposed in a second location in imaging.

Referring to FIGS. 11 and 12, the camera door 700 is disposed in the second location in which light is permitted to be incident to the camera module 500 in imaging. Specifically, the camera door 700 is biasedly disposed in the right of the camera module support body 600 and allows the light transmission window 720 of the camera door 700 to be exposed in the front opening 210. At this time, the fixing protrusion 770 (see FIG. 7) of the camera door 700 is inserted into the second fixing groove 666 (see FIG. 8) of the camera module support body 600 and fixes the camera door 700 to the second location (the location in which light is permitted to be incident to the camera module 500). Therefore, the camera module 500 is shown in the front opening 210 through the light transmission window 720.

The driving switch push portion 780 of the camera door 700 presses the first terminal 910 of the driving switch 900 to bring the first terminal 910 to be in contact with the second terminal 920 in imaging. Therefore, the driving switch push portion 780 brings the first terminal 910 to be in contact with the second terminal 920 to maintain a power-on state of the voice sensing modules 410 and 420 and the camera module 500 in imaging.

The disposition of the camera door 700 in the first location (the location in which light is blocked to be incident to the camera module 500) and the second location (the location in which light is permitted to be incident to the camera module 500) is achieved through sliding of the camera door 700 by an operation of the location control knob 740 by the user.

As described above, the sliding between the first location and the second location is performed along a length direction (the Y-direction) of the camera door 700. When the user disposes the camera door 700 in the first location or the second location, the user may slide the location control knob 740 along the length direction (the Y-direction) of the camera door 700.

For example, when the user disposes the camera door 700 disposed in the first location in non-imaging to the second location for imaging, the user slides the location control knob 740 to the right direction (the +Y-direction). Thus, the camera door 700 is slid to the right direction (the +Y-direction), and the fixing protrusion 770 (see FIG. 7) is deviated from the first fixing groove 665 (see FIG. 8). According to the sliding of the camera door 700 to the right direction (the +Y-direction), the driving switch push portion 780 of the camera door 700 presses the first terminal 910 of the driving switch 900, and the first terminal 910 is in contact with the second terminal 920 to turn on the power of the voice sensing modules 410 and 420 and the camera module 500. When the camera door 700 is reached in the second location, the first sub sliding rib 752 (see FIG. 7) is locked to the locking projection 670 of the camera module support body 600, and the fixing protrusion 770 (see FIG. 7) is inserted into the second fixing groove 666 (see FIG. 8) to fix the camera door 700 to the second location.

Figure 13:
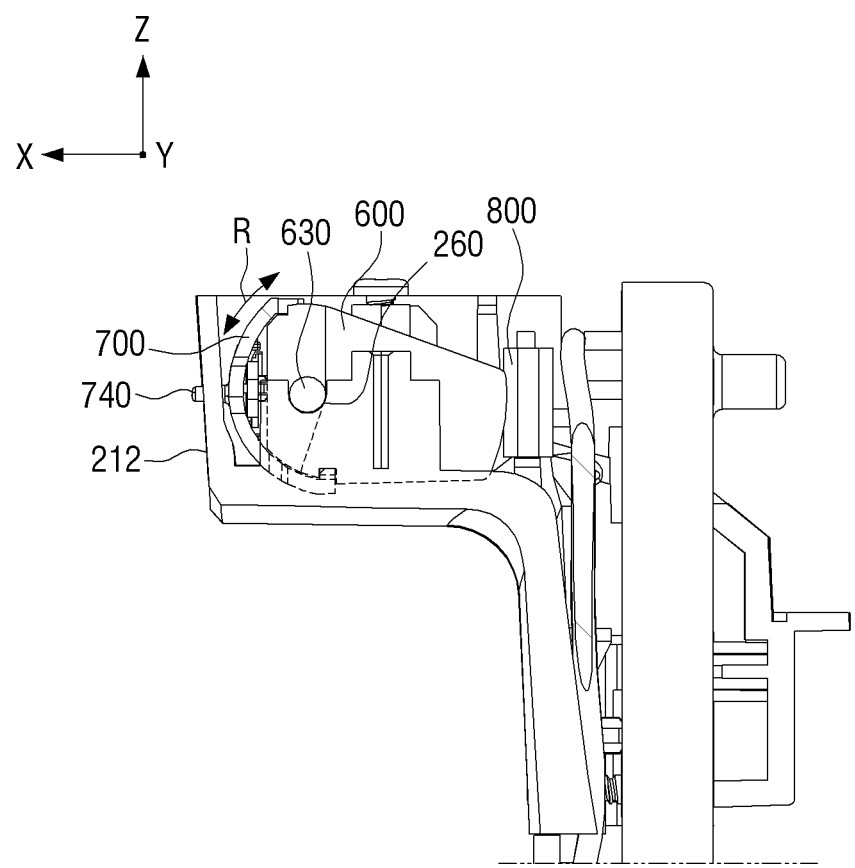
FIG. 13 is a view illustrating tilt control of a camera module.

FIG. 13 is a view explaining tilt adjustment of a camera module.

Referring to FIG. 13, when the user adjusts the tilt of the camera module 500 (see FIG. 6), the user moves the location control knob 740 of the camera door 700 to a vertical direction (a Z-direction) by a desired angle. Therefore, the camera module support body 600 mounted with the camera door 700 may be rotated to an arrow direction (R) using the shaft protrusion 630 as a rotation center. At this time, since the friction pad 800 is in contact with the camera module support body 600, backlash of the camera module support body 600 after the tilt adjustment may be prevented due to friction force between the friction pad 800 and the camera module support body 600.

Therefore, in the exemplary embodiment, the tilt adjustment of the camera module 500 with a sliding operation of the camera module 500 may be achieved through an operation of the single location control knob 740 in imaging or non-imaging.

As described above, since the display apparatus 1 according to the exemplary embodiment may not expose the camera module 500 to the outside of the display apparatus 1 in non-imaging, the unpleasant feeling of the user due to expose of the camera module 500 in non-imaging may be removed.

The foregoing exemplary embodiments and advantages are merely exemplary and are not to be construed as limiting the present concept. The exemplary embodiments can be readily applied to other types of devices. Also, the description of the exemplary embodiments is intended to be illustrative, and not to limit the scope of the claims, and many alternatives, modifications, and variations will be apparent to those skilled in the art.

What is claimed is:

1. A display apparatus which provides user interaction, the display apparatus comprising:
a display main body having a display screen;
a camera module mounted on the display main body and configured to image a user to perform the user interaction;
a camera door configured to slidably move between a first location in which light is blocked from being incident to the camera module and a second location in which light is permitted to be incident to the camera module; and
a camera module support body configured to support the camera module,
wherein the camera module support body is tiltably mounted on the display main body on a basis of a rotation axis perpendicular to an optical axis of the camera module,
wherein the camera door is slidably mounted on the camera module support body between the first location and the second location, and
wherein the camera module is tiltable by the camera door.

2. The display apparatus as claimed in claim 1, wherein the camera door has a light transmission window disposed in front of the camera module in the second location.

3. The display apparatus as claimed in claim 2, wherein a locking projection configured to stop sliding of the camera door at the second location when the camera door slides from the first location to the second location is formed in the camera module support body.

4. The display apparatus as claimed in claim 3, wherein at least one sliding rib is formed in the camera door, and at least one slide guide groove into which the at least one sliding rib is slidably inserted is formed in the camera module support body.

5. The display apparatus as claimed in claim 4, wherein the slide guide groove includes a first slide guide groove formed in a top of the camera module support body, and a second slide guide groove formed in a bottom of the camera module support body, and
the locking projection is formed in one end portion of the first slide guide groove.

6. The display apparatus as claimed in claim 5, wherein a first fixing groove configured to fix the sliding rib in the first location and a second fixing groove spaced apart from the first fixing groove and configured to fix the sliding rib in the second location are formed in the second slide guide groove.

7. The display apparatus as claimed in claim 2, wherein a location control knob for driving of sliding of the camera door and driving of tilt of the camera module support body is formed in the camera door.

8. The display apparatus as claimed in claim 7, wherein the location control knob is projected from a front of the camera door.

9. The display apparatus as claimed in claim 2, further comprising a friction pad configured to be in contact with the camera module support body and provide friction force to the camera module support body when the camera module support body is tilted.

10. The display apparatus as claimed in claim 7, further comprising an interaction casing configured to receive the camera door and the camera module support body,
wherein a front opening configured to expose the location control knob in the first location and expose the light transmission window and the location control knob in the second location is formed in the interaction casing.

11. The display apparatus as claimed in claim 10, wherein a pair of shaft protrusions are formed in both sides of the camera module support body,
a pair of shaft grooves into which the pair of shaft protrusions are inserted are formed in the interaction casing, and
the camera door and the camera module support body are tilted on the basis of the rotation axis according to vertical pressing of the location control knob.

12. The display apparatus as claimed in claim 11, further comprising a friction pad mounted on the interaction casing to be in contact with the camera module support body, and provide friction force to the camera module support body when the camera module support body is tilted.

13. The display apparatus as claimed in claim 10, further comprising a driving switch mounted on the interaction casing and configured to drive the camera module through contact between a first terminal and a second terminal disposed to be spaced apart from each other,
wherein the first terminal is pushed by the camera door and comes in contact with the second terminal when the camera door moves to the second location.

14. The display apparatus as claimed in claim 2, wherein a receiving groove in which the camera module is received and at least one hook fitting groove, to which a fixing hook configured to fix the camera module to the receiving groove is fit, are formed in the camera module support body.

15. The display apparatus as claimed in claim 1, wherein a lens cleaning member configured to be in contact with a front of the camera module when the camera door is slid is mounted on an inner surface of the camera door.

16. A display apparatus which provides user interaction, the display apparatus comprising:
- a display main body having a display screen;
- a camera module mounted on the display main body and configured to image a user to perform the user interaction;
- a camera door configured to slidably move between a first location in which light is blocked from being incident to the camera module and a second location in which light is permitted to be incident to the camera module; and
- a camera module support body configured to support the camera module,
- wherein the camera module support body is tiltably mounted on the display main body on a basis of a rotation axis perpendicular to an optical axis of the camera module.

17. The display apparatus as claimed in claim 16, wherein the camera door is slidably mounted on the camera module support body between the first location and the second location.

* * * * *